May 14, 1963     R. M. WILMOTTE     3,090,044

RADIO DIRECTION FINDING SYSTEMS

Filed May 2, 1958     2 Sheets-Sheet 1

INVENTOR
Raymond M. Wilmotte

BY *Paris, Haskell & Lewis*

ATTORNEYS

United States Patent Office 3,090,044
Patented May 14, 1963

3,090,044
RADIO DIRECTION FINDING SYSTEMS
Raymond M. Wilmotte, New York, N.Y.
(68 Mountain Ave., Princeton, N.J.)
Filed May 2, 1958, Ser. No. 732,633
5 Claims. (Cl. 343—113)

The present invention relates to radio direction finding or radar and particularly to the determination of the direction of a target or transmitter when it has motion relative to the receiver.

It is frequently necessary to determine the direction of a target or transmitter which is radiating a wide frequency band. This may occur, for example, in the case of tracking a jammer.

It can be shown that it is desirable from the standpoint of information theory to irradiate a radar target with a broad band of frequencies having, preferably, a uniform spectrum in order to increase the accuracy of measurement of direction. Generally, it is desirable to integrate the energy from the target over a long period of time in order to increase the signal to noise ratio or permit satisfactory reception with variable level signals.

If the relative motion of a target (in radar) or a transmitter and the receiver are known, it is possible to adjust the reception to take care of the change in relative position with time so that the signal of the transmitted and received signals keeps on adding up in phase, while noise and interfering signals will not.

If the relative motion is not known, or is known only approximately, the effective time of integration will be limited by this knowledge. In effect, to maintain useful correlation or adding up, the variation of the actual path from the predicted path should produce a relatively small change in phase and, therefore, be a fraction of a wavelength during the effective time of integration.

Alternatively, the difference between the correlation received and perfect correlation is a measure of the degree to which the motion of the target differs from the knowledge of that motion and the correlation of the expected motion in the receiving system.

Essentially then, it is necessary to provide a correction of phase at the receiver to allow for the changed relative position of the target with time. A simple example of this principle is well known. In the case of radar, if a target is moving with velocity directly toward the radar, the frequency received is different from that transmitted by the Doppler frequency.

Hence, if a phase shift is produced on the received signal, and that signal is integrated, it will be possible to resolve this particular target from other targets and noise proportionately to the time of integration. In this case correlation between the transmitted radar waveform and the received echo waveform is usually very good. The correlation is not perfect because of the motion of the target, which in this case produces a variation at a rate corresponding to the Doppler frequency. This deviation from perfect correlation is, therefore, a measure of the velocity of the target relative to the radar. It is normally measured by means of a filter tuned to the Doppler frequency, from which the motion of the target, that is, the relative radial velocity, can be deduced. If the relative radial velocity were known, the corresponding Doppler frequency could be introduced to change the frequency of the received signal by that amount. In this case, the correlation would become perfect and integration could be carried out to improve the signal to noise ratio for as long as the relative motion remained unchanged.

If the target has a tangential velocity relative to the receiver this again limits the possible integration time. One object of the invention is to reduce the limitation of the useful time of integration in the presence of a tangential velocity of the target.

For the sake of simply explaining the invention it will be assumed that the signals from the target are received by two spaced radiators and that the energy from these antennas is fed to a correlator or spectrum analyzer. The two spaced antennas in combination form a frequency conscious antenna, by which is meant that the directional pattern is different for different frequencies. While the explanation is given in connection with two spaced antennas, its application to the general case of frequency conscious antennas will be evident. It will be evident upon consideration that a spectrum analyzer as well as a correlator involve integration over a period of time and that for the reason given above integration over a period of time is desirable.

According to one aspect of the invention, the varying phase relationship between the signals received by spaced antennas due to the tangential velocity is compensated by adding a frequency proportional to the tangential velocity to the signals received by one of the antennas before correlation or spectrum analysis.

In another embodiment of the invention, the tangential velocity effect is compensated by introducing a time delay equal to the difference in time of arrival of the signals at the two antennas.

According to another aspect of the invention, broad frequency spectra of energy received from a distant source by a pair of frequency sensitive antennas having overlapping radiation patterns are added together, subtracted or lobe-switched so as to produce a resultant the spectrum of which indicates the direction of the source.

The invention will be fully understood from the following description and the accompanying drawings in which:

FIG. 1 is a schematic diagram of one embodiment of my invention;

FIG. 2 schematically shows another embodiment of the invention;

Figure 1:
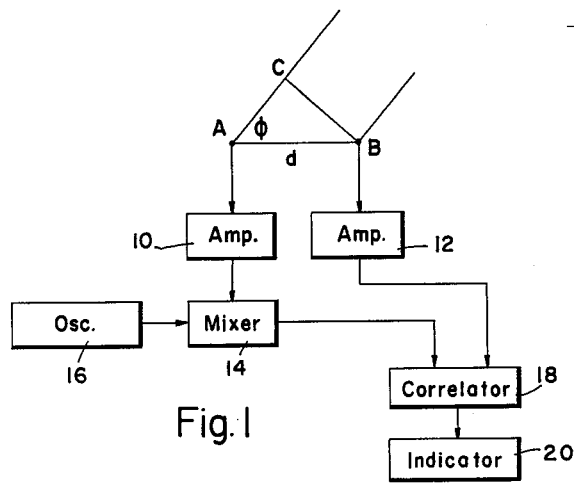

Referring to the drawings it will be assumed that a broad, uniform spectrum of signals is received at a pair of antennas A and B having a spacing $d$. Thus the signals will be received at antenna A with a delay corresponding to the distance AC. The signals from antennas A and B are fed through a pair of amplifiers 10 and 12. Amplifier 10 is connected to a mixer 14 which is supplied with oscillations having a frequency equal to $$\frac{W}{c} \frac{V_t d}{D} \sin \phi$$

where W is the center frequency of the received carrier waves, $V_t$ is the tangential component of the velocity of the target relative to the receiving station, D is the distance to the target, $\phi$ is the angle or direction to the target and $c$ is the velocity of light ($d/D$ is assumed to be small, otherwise a correction will have to be introduced). The factors determining this frequency can be measured at least to a first order of approximation by the usual radar techniques and a computer or control circuit can be provided for adjusting the frequency of oscillator 16 to the proper frequency. Alternatively, the frequency of oscillator 16 could be controlled manually or made to hunt until a maximum correlation and a resultant indication of the direction is obtained. The output of mixer 14 and amplifier 12 are supplied to a cross-correlator 18 which multiplies and integrates the signals fed thereto. The value of the integrated product of the signals will depend on the phase relationship of the two signals fed to the correlator and this of course is determined by the angle $\phi$ of the direction of the target. Hence the direction indicator 20 may be connected to the output of the correlator to give an indication of the direction in accordance with the magnitude of the output of correlator 18.

Figure 2:
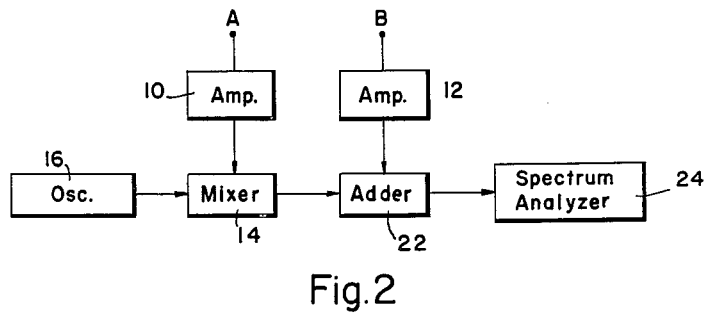
Figure 3:
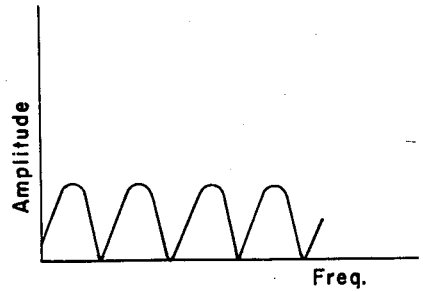
FIG. 3 shows a waveform diagram explaining the operation of FIG. 2.

In FIG. 2 the signals received by antennas A and B and fed through the amplifiers 10 and 12 are supplied to a mixer 14 and to an adding circuit 22. Mixer 4 is also connected to an oscillator 16 of the same type as shown in FIG. 1 for producing a frequency corresponding to the tangential velocity of the target relative to the receiver. The output of the mixer 14 is fed to adding circuit 22 to be combined with the energy from amplifier 12. The signals supplied to adding circuit 22 will now have the same phase relationship they would have if the target had no tangential velocity. The output of adder 22 is supplied to a spectrum analyzer 24 which gives a display of the amplitudes of the combined signals as a function of the frequency. Spectrum analyzers of this type are well known in the art and could be, for example, of the type generally referred to as panoramic analyzers or panoramic receivers. The pattern produced by the spectrum analyzer may have the form indicated in FIG. 3. The number of loops of the pattern will be a function of the angle $\phi$ or the direction of the target. If for the sake of simplicity it is assumed that the only limitation of the permissible or useful time integration of the signals is governed by the tangential velocity only, the introduction of the tangential velocity compensating frequency from oscillator 16 will permit the spectrum analyzers to utilize a long time integration. If other factors are involved, such as differences in the radial Doppler effect at the two antennas, these other limitations on the time of integration can be compensated by techniques already known in the art. When $d/D$ is small the radial Doppler frequencies can generally be considered the same at both receivers.

Figure 4:
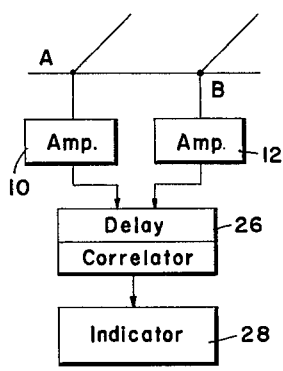
FIG. 4 is a block diagram of another embodiment of my invention.

FIG. 4 shows a modification of the system shown in FIG. 1. In the system of FIG. 4, a delay corresponding to the distance AC is introduced by the correlator. The signals from antennas A and B are again fed through amplifiers 10 and 12 to the delay device and cross-correlator 26. The delay portion of the cross-correlator may include a pair of transparent sonic delay lines on which the signals from amplifiers 10 and 12 are impressed, and a relative delay is introduced by picking off a response along different points of the two delay lines. This can be done by placing photo-cells along different points of the delay lines and passing a beam of light through the delay lines to the photo-cells. The photo-cells are adjusted along the delay lines until the photo-cell outputs show an auto-correelation An auto-correlator of this type is disclosed in Patent No. 2,664,243. The output of the auto-correlator can then be fed to an indicator 28. It will be understood that the delay portion of the auto-correlator 26 introduces a time delay corresponding to the distance AC so that the phase shifts during the time $t$ required to traverse this distance AC will not vary because of the tangential velocity, and, accordingly, the correlation between the two signals received by the two antennas will not be destroyed. The adjustment of the delay device will give an indication of the direction while the frequency of the output of the photo-cell outputs will measure the tangential velocity in the form $$\frac{WV_t d \sin \phi}{cD}$$

Figure 5:
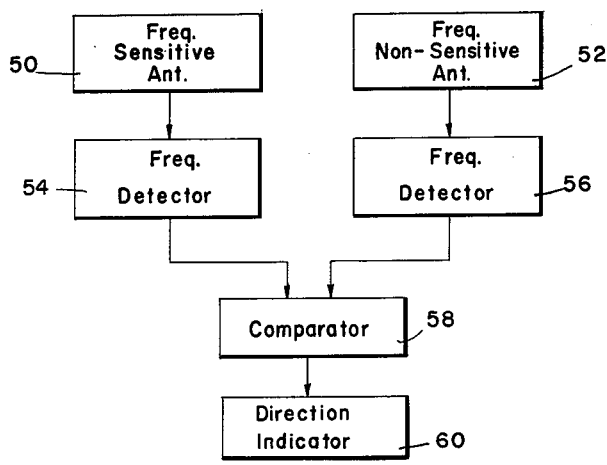
FIG. 5 is a block diagram of another embodiment of my invention.

In the embodiment of the invention shown in FIG. 5 the energy from the target is received by the frequency sensitive antenna 50 and the antenna 52 which is not frequency sensitive. The output of each antenna is fed to the frequency spectrum detectors 54 and 56 which produce amplitudes varying with the frequency of the received waves. The outputs of the frequency spectrum detectors are fed to a comparator 58 which may produce a curve showing the ratio of the frequency pattern received by antenna 50 compared with that received by antenna 52 and this information will give the direction on a suitable indicator 60 of the incident angle of the received radiation.

There are many methods known in the art for dividing two quantities such as the outputs of detectors 54 and 56 to produce a curve representing their ratio. One such method is disclosed in patent application Serial No. 607,769, filed February 4, 1956, now abandoned, and comparator 58 may be of the form disclosed therein.

Figure 6:
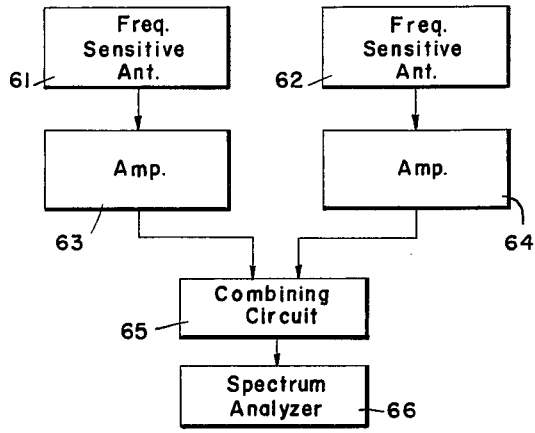
FIG. 6 is a block diagram of a directional receiver according to my invention.

FIG. 6 shows an embodiment of the invention in which energy is received from a target or a source having a wide uniform frequency band. The energy is received by two frequency sensitive antennas 61 and 62 which may have for each frequency the directional patterns indicated in FIG. 6A. The two antenna patterns preferably are identical, except that their axes are in slightly different directions. After passing through suitable amplifiers 63 and 64, the signals are supplied to a combining circuit 65. The combining circuit may be a circuit which adds the two inputs or subtracts the two inputs or switches very rapidly from one antenna to the other. The output of the combining circuit is supplied to a spectrum analyzer 66.

Figure 7:
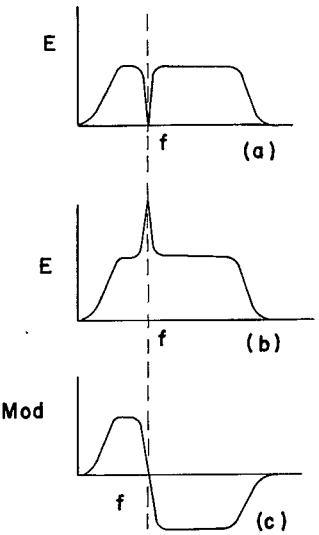
FIG. 7 is a diagram representing the outputs obtained in the apparatus of FIG. 6.
Figure 6A:
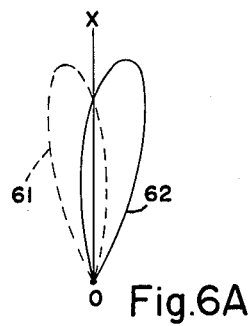
FIG. 6a shows the radiation patterns of the antennas of FIG. 6.

As can be seen from FIG. 6A, the radiation patterns of the two antennas overlap along a line OX so that the signals from the two antennas are equal at the one particular frequency corresponding to the line OX. If the combining circuit 65 is one which subtracts the input of one antenna from the other, the output of the subtracting circuit will have the form indicated in FIG. 7(a) which shows the amplitude of the product as a function of the frequency. It will be seen from FIG. 7(a) that at a particular frequency, the output of the subtracting circuit will be zero, so that if a spectrum analysis is made of the output, the absence of this particular frequency will indicate the direction OX. If the combining circuit 65 adds the outputs of the two antennas, the resultant will be of the form indicated in FIG. 7(b) and will show a peak output in the frequency corresponding to the direction OX. Where the combining circuit is a switching circuit which switches very rapidly from one antenna to the other, the sum of the outputs of the switching circuit will have a modulation, the envelope of which will vary with frequency as indicated in FIG. 7(c). The modulation that is obtained will go through a 0 or minimum value at a point corresponding to the direction OX.

When circuit 65 is a combining circuit of the type which subtracts the antenna inputs, a target which is being tracked will be unable to jam the receiver. The reason for this is that should the target transmit a wide frequency band or even a narrow band of jamming signals which would normally cause jamming, the frequency of interest, namely the critical frequency corresponding to the direction OX will not be received by the radar antennas 61 and 62. The radar receiver will then act essentially as a direction finder for both the radar signal and any jamming signal from the target.

What I claim is:

1. Apparatus for determining the direction of a target or a source of wide frequency band radio waves comprising a pair of spaced antennas, one of said antennas being a frequency sensitive antenna having a radiation pattern which is a function of the frequency of the received wave, and means connected to said antennas for analyzing the spectra of the signals received by both antennas and determining the direction of arrival of said radio waves.

2. Apparatus according to claim 1, wherein both of said antennas are frequency sensitive antennas.

3. Apparatus according to claim 1, wherein said means for analyzing the spectra of the received signals include a frequency detector connected to each antenna for producing output signals having amplitudes varying with the frequency of the received waves, and means connected to the outputs of said frequency detectors for comparing said outputs and determining the direction of arrival of the received waves.

4. Apparatus according to claim 1, wherein both of said antennas are frequency sensitive antennas having partially overlapping radiation patterns, and said means for analyzing the spectra of the received signals include a circuit connected to said antennas for combining the signals received thereby and a spectrum analyzer connected to said combining circuit.

5. Apparatus according to claim 4, wherein said combining circuit is a subtracting circuit for subtracting the signals received by one antenna from the signals received by the other antenna.

References Cited in the file of this patent

UNITED STATES PATENTS

| | | |
|---|---|---|
| 2,140,130 | Earp | Dec. 13 1938 |
| 2,166,991 | Guanella | July 25, 1939 |